Figure 1:
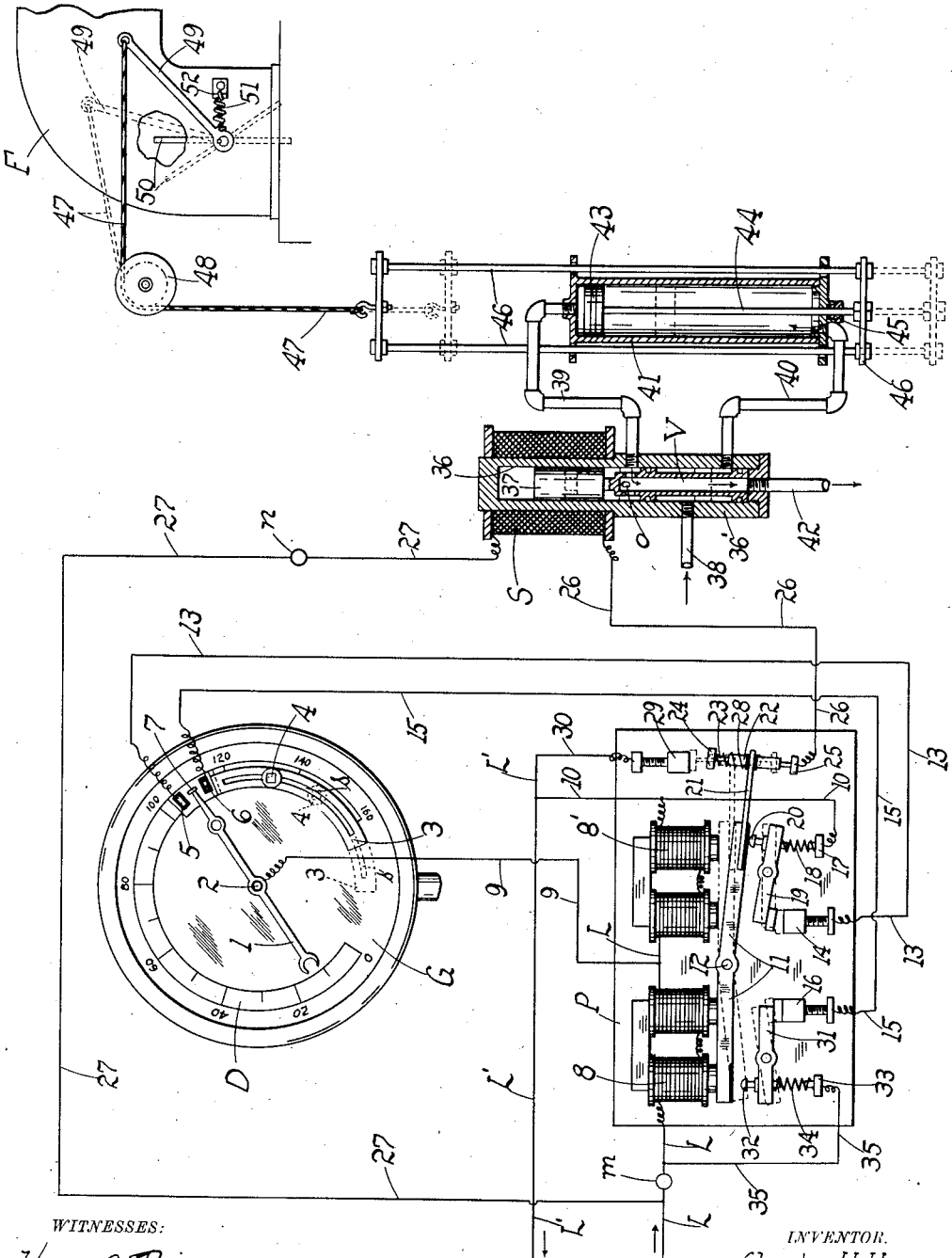

C. H. HERR.
MOTOR CONTROL.
APPLICATION FILED JAN. 30, 1915.

1,165,098.

Patented Dec. 21, 1915.
2 SHEETS—SHEET 1.

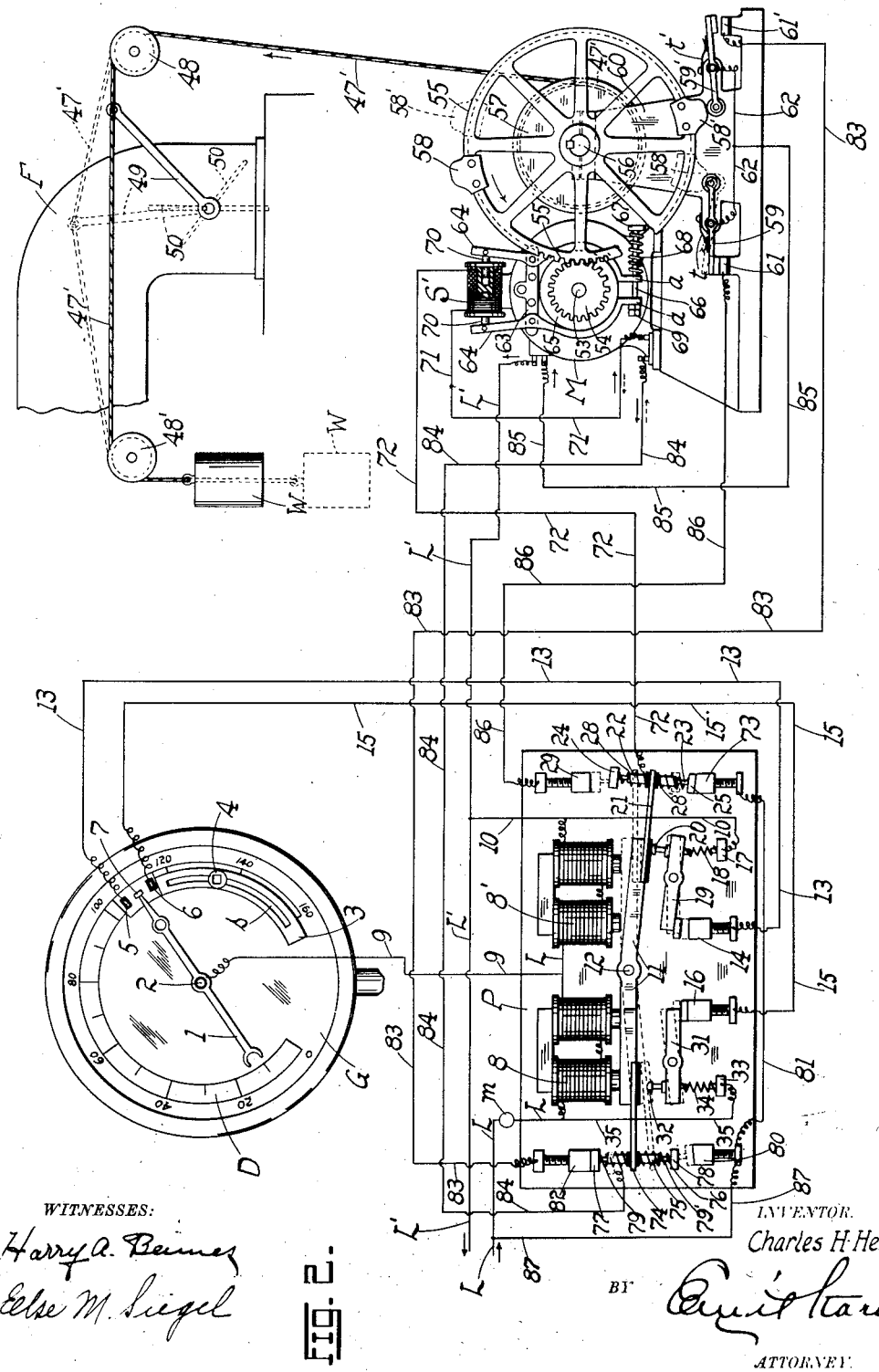

UNITED STATES PATENT OFFICE.

CHARLES H. HERR, OF ST. LOUIS, MISSOURI.

MOTOR CONTROL.

1,165,098.  Specification of Letters Patent.  Patented Dec. 21, 1915.

Application filed January 30, 1915. Serial No. 5,244.

*To all whom it may concern:*

Be it known that I, CHARLES H. HERR, a citizen of the United States, residing at St. Louis, State of Missouri, have invented certain new and useful Improvements in Motor Controls, of which the following is a full, clear, and exact description, reference being had to the accompanying drawings, forming a part hereof.

My invention has relation to improvements in motor controls; and it consists in the novel features of construction more fully set forth in the specification and pointed out in the claims.

The present invention is directed to motor-controlling devices which operate in response to predetermined conditions such as conditions of temperature, pressure and the like, with a view of ultimately controlling other devices actuated by the motor, and which are directly responsible for the conditions to which the motor-controlling device responds. As an example of such controlling device may be mentioned a pressure gage, a thermostat, steam gage, and the like; as an example of the motor may be mentioned a reciprocating piston of a cylinder, operated by a motor-fluid controlled by a valve which is in turn actuated electrically. Another example of such motor may be mentioned an electric rotary motor. As an example of the "devices" actuated by the motor may be mentioned a furnace damper, said damper determining the conditions to which the gage or thermostat shall respond.

The object of the invention is to provide a motor-control which will be positive in action, simple in construction, reliable, extremely sensitive, one operating within any prescribed ranges of conditions, and one possessing further and other advantages better apparent from a detailed description, in connection with the accompanying drawings, in which—

Figure 1 represents a combined conventional and diagrammatic plan of a control applied to a reciprocating cylinder-piston coupled to a furnace damper; and Fig. 2 is a similar view of a control applied to an electric motor coupled to a furnace damper.

Referring to the drawings, and for the present to Fig. 1 thereof, G represents a pressure gage provided with the usual dial D and a pointer or indicator 1 rotating about a spindle 2 as an axis, as well understod in the art and herein shown conventionally. Mounted upon the dial (over which the pointed end of the indicator sweeps) is a curved plate 3 provided with an arcuate slot *s* which conforms to the curvature of the dial, the slot receiving the stem of a screw 4 which screws into the face of the gage and fastens the plate in position, the arrangement permitting the plate to be adjusted circularly along the dial and set to any predetermined position as indicated by the dotted position in said Fig. 1. Secured to, and insulated from the plate 3 are spaced contacts 5, 6, across which is adapted to sweep a contact 7 secured to the indicator arm of the pointer 1. The contact 7 has thus more or less play between the contacts 5, 6, before engaging either one of the latter, this play depending on the space between the contacts 5, 6, which in the present instance is shown fixed, though it is within the scope of my invention to have the contacts 5, 6, adjustable on the plate 3. L, and L' represent respectively the feed and return wires of an electric circuit, there being disposed in the path of the wire L, the solenoids or electro-magnets 8, 8', spaced a suitable distance apart, a wire or conductor 9 leading from the line wire L between the solenoids to the pivotal axis or spindle 2 of the pointer, the solenoid 8' being connected to the line wire L' through a wire or conductor 10, the solenoids 8, 8', being disposed in series and mounted on a plate or slab P.

Pivotally mounted at a point between and opposite to, the solenoids or electro-magnets 8, 8', is a bent lever-armature 11, free to oscillate about a pin or stud 12, one arm of the lever serving as an armature for the magnet 8, and the other arm serving as an armature for the magnet 8'. When the two magnets or solenoids are equally energized their respective armatures will of course be attracted equally; otherwise however when one of the solenoids is short-circuited as will more fully hereinafter appear. Leading from the contact 5 is a wire 13 the same terminating at a contact 14; and leading from the contact 6 is a wire 15 which terminates at a contact 16. The wire 10 terminates at one end in a fixed member 17 which supports one end of an expansion spring 18 interposed between said support and a circuit breaker 19, the latter coöperating with the contact 14 and being provided with a pin 20 adapted to engage the insulated end of the adjacent arm of the lever armature 11, said arm carrying an extension or supporting member 21 which carries an insulated sleeve or bearing 22 traversable by a stem 23 terminating in heads 24, 25, respectively, the former serving as a contact head and the latter as a means for securing thereto the adjacent end of a wire 26 forming one of the terminals of a valve-controlling solenoid S whose opposite terminal or wire 27 couples to the feed or line wire L. A suitable expansion spring 28 is interposed between the member 21 and head 24 to cushion the impact of the latter against a contact 29 connected to the line L' by a wire 30. Coöperating with the contact 16 is one end of a circuit breaker 31 whose opposite end is provided with a pin 32 and having interposed between said end and a fixed member or support 33 an expansion spring 34, the member 33 being connected to the line wire L by a wire or conductor 35. The circuit breakers 19 and 31 and their immediate appurtenances are identical and operate alike. Disposed in the line L in advance of the wire 35 is a light $m$, and in the path of the wire 27 is a light $n$ which serve to indicate whether or no a curren is traversing the respective wires.

The hollow core 36 of the solenoid S is provided with an outer extension 36' serving as a valve casing, the core proper being traversed by the plunger armature 37 to which the hollow piston-valve V traversing the casing 36' is coupled. Discharging into the valve-casing 36' is a pipe 38 through which a motor fluid such as steam, compressed air or gas may be conducted into the casing at points between the heads or terminals of the piston-valve, said casing having leading therefrom at opposite ends thereof, the motor-fluid of steam pipes 39, 40, respectively, the former tapping one head of a piston cylinder 41, and the latter tapping the opposite head. The bore or passageway of the hollow valve V communicates with an exhaust pipe 42 leading from the bottom of the valve-casing 36', the inner terminal of the valve beyond the inner head being provided with peripheral openings $o$ for establishing communication between the valve casing and pipe 42 through the bore or passage-way of the valve. Operating in the cylinder 41 is a piston 43 from one face of which extends a piston-rod 44 through a stuffing box 45 in the head tapped by the pipe 40. The outer end of the piston rod is connected to the adjacent end of a reciprocating frame or yoke 46 guided by operating through the cylinder heads as shown (or otherwise) the yoke having connected thereto one end of a cable or other flexible connection 47 passing over a guide pulley 48, the opposite end of the cable being secured to an oscillating arm 49 leading from the hinge axis of a damper 50 in a furnace flue F, the flow of the gases through which, the damper is intended to regulate. The arm 49 is coupled to a contracting spring 51 one end of which is secured to a bracket 52 and the opposite end to the arm 49 at a point removed from the axis of rotation of the damper, the spring serving to draw or swing the arm in one direction or opposite to that in which it is actuated by a draft on the cable 47. With the valve V as shown in Fig. 1, steam or other motor-fluid is free to flow from the pipe 38 through the space around the valve and between the heads thereof into the pipe 40, thereby raising the motor piston 43 as shown and lifting the yoke 46, which thus allows the spring 51 to pull on the arm 49 and oscillate or swing the damper 50 to full open position. To cause the damper to close or partially close, it would be necessary for the piston 43 to descend, which happens when the valve V is raised sufficiently to lift the upper head thereof above the inlet to the pipe 39, and the lower head above the inlet to the pipe 40. In that case the steam will flow into the space around the valve into the pipe 39 forcing the motor piston 43 down or in the opposite direction, the steam below the piston exhausting through the pipe 40 and pipe 42 (the exhaust flowing through the openings or ports $o$ and passage-way of the hollow valve and pipe 42 with a rise of the piston 43 is quite obvious). The damper closes or partially closes when the pressure of steam (assuming that G is a steam or pressure gage) rises above a predetermined point, in the present case said point being determined by the position of the contact 6 over the dial D, which as shown is in the neighborhood of the 115 pound mark on the dial, the contact 5 being substantially opposite the 105 pound mark. The pointer 1 is thus free to sweep or fluctuate through an arc represented by ten pounds difference in pressure (between the contacts 5, 6,) before the contact 7 thereof wipes either of the contacts 5, 6.

The operation may be described as follows: As long as the contact 7 of the pointer 1 is out of engagement with either of the contacts 5, 6, the current from the line L will flow through the solenoids 8, 8', thence through wire 10 back to the line wire L', both solenoids being equally energized and both attracting their respective armature lever-arms with equal intensity, the right-hand arm however being weighted by the member 21 and parts 22, 23, 24, 25, dropping to the position indicated. Should the gage pressure rise sufficiently to swing the pointer so as to cause the contact 7 thereof to engage the contact 6, thereby bringing the wire 15 into the circuit, the current, taking the path of least resistance, will flow from the line L, through the wire 35, members 33, 34, 31, 16, wire 15, contacts 6, 7, pointer 1, wire 9, short circuiting the solenoid 8 and flowing through solenoid 8', wire 10 and thence out through the wire L'. In this way the solenoid 8' alone becomes energized, attracting its armature lever-arm (see dotted position Fig. 1) and causing the contact head 24 on the stem 23 to engage the contact 29, whereupon the wire 26 leading from the solenoid S is brought into circuit, the current flowing from the line wire L through wire 27, solenoid S, wire 26, members 25, 23, 24, 29, wire 30, thence out through wire L'. Thus the solenoid becomes energized and draws in or lifts the plunger armature 37 and the valve V secured thereto. With the lifting of the valve, the path of the motor-fluid or steam through the casing 36' and pipe 39 will be as previously described, the piston 43 being depressed and the damper 50 closed or partially closed. The closing or partial closing of the damper 50 will reduce the intensity of the furnace fire and thus reduce the steam pressure, preventing the latter from rising above the point indicated on the dial at the contact 6. On the other hand should the furnace fire become low and the steam pressure drop sufficiently to cause the pointer-contact 7 to connect with the contact 5 so as to bring the wire 13 into circuit, the current will flow from the line L through solenoid 8 (the solenoid 8' being short-circuited) wire 9, pointer 1, contacts 7, 5, wire 13, members 14, 19, 18, 17, 10, and thence through the return wire L'. After either arm of the lever armature 11 once leaves the pin (20, 32) of the corresponding circuit-breaker (19, 31,) as a result of the lifting of such arm by a previous energization of its solenoid, the spring (18, 34,) forces the circuit-breaker into engagement with its contact (14, 16,) thereby bringing such circuit-breaker into the circuit of the solenoid (8, 8') which happens to become energized by reason of the electric connection formed between the pointer-contact 7 and one of the contacts 5, 6. In the circuit last traced it is assumed that the circuit-breaker 19 occupies the dotted position, the right hand lever arm of the armature 11 having been swung away from the pin 20 by reason of the previous energization of the solenoid 8' and the lifting of said arm off said pin. On the other hand with the energization of the solenoid 8 (and the short circuiting of the solenoid 8') the left hand armature lever-arm will be attracted or lifted off the pin 32, the right hand arm striking the pin 20 and (the spring 18 yielding) tripping the circuit breaker 19 away from its contact 14. At the same time the contacts 29 and 24 are separated. The separation of these contacts (29, 24,) breaks the circuit through the solenoid S, thus allowing the plunger armature 37 and its valve V to drop, whereupon the motor fluid takes the course through the valve casing and pipe 40, lifting the piston 43 and yoke 46, and permitting the damper 50 to be swung to open or full open position by the tension of the spring 51.

The gage G may of course indicate temperatures as well as pressures, or other conditions to which the pointer 1 is responsive, and the particular ranges of condition through which the pointer may act before it affects the piston 43 (through the electrically actuated or electrically-controlled valve V) will depend on the position of the contacts 5, 6, relatively to the dial and relatively to each other. If for example the plate 3 be shifted so as to bring the contacts opposite the 80 and 90 mark on the dial D, then the piston 43 and hence the damper 50 would be controllable between the conditions (of pressure or temperature or other condition depending on the character of dial used) represented by these marks. Again should the contacts 5, 6, be made relatively adjustable to one another, it is obvious that the pointer 1 would act between certain other condition limits. The particular character of condition to which the member 1 (or its equivalent) responds is immaterial so far as my invention is concerned.

In lieu of the steam or fluid motor shown in Fig. 1 (the steam operated piston 43 controlled by the valve V, being in effect a steam motor or engine) I may substitute a reversible rotary electric motor M as shown in Fig. 2 for the purpose of controlling the damper 50. In this figure, parts which correspond and are identical with, parts shown and already described in connection with Fig. 1 are identified by the same reference numerals and the description thereof need not be repeated. The shaft 53 of the rotor of said motor M carries a pinion 54 which meshes with a gear wheel 55 on the shaft 56 of a winding-disk or drum 57 about which wraps and from which leads, the cable 47' over the guide pulley 48 (as in Fig. 1) and guide pulley 48', a weight W being substituted in this modification for the spring 51 in the first form, for swinging the damper 50 to closed position. Carried by the periphery of the wheel 55 at points substantially diametrically opposite one another are cams or trippers 58, 58', coöperating respectively with the roller ends of the inner arms of the spring-controlled circuit-breakers 59, 59', mounted pivotally at the base of the standard 60 supporting the shaft 56, a flexed spring t, (t') insulated from the circuit-breaker normally tending to force the outer arm thereof into engagement with a suitable contact, to wit, a contact 61 for the circuit-breaker 59, and a contact 61' for the circuit-breaker 59'. The pivot pins of the said circuit-breakers are connected electrically by a wire 62.

Mounted pivotally to a bracket 63 at the side of the motor-frame are a pair of brake-levers 64, 64, the lower arms thereof being curved to embrace the periphery of a brake disk 65 mounted on the motor shaft adjacent the pinion 54. The free ends of the brake arms of the brake levers terminate in lugs $a$, $a$, through which loosely passes a rod 66, terminating at one end in a head or abutment 67 against which bears one end of an expansion spring 68 coiled about the rod, the opposite end bearing against the adjacent lug $a$. The end of the rod outside the opposite lug $a$ is provided with a locknut 69. It will be seen from the foregoing that the spring 68 if left to expand freely will force the brake arms or shoes of the levers 64 toward each other and into firm frictional contact with the brake drum or disk 65 and thus arrest the rotation of the motor. The upper arms of the brake levers 64 carry the plunger armatures 70 operating freely in the core of the brake solenoid S′ mounted on the motor frame. By energizing the solenoid S′, the plunger armatures will be drawn inward, overcoming the tension of the spring 68, causing an oscillation of the upper arms of the brake levers toward the solenoid, and oscillating the brake-shoes or curved lower arms away from the disk 65, thereby releasing the latter, and allowing the motor shaft to rotate freely.

One of the terminals of the brake solenoid is connected to the armature of the motor by a wire 71, the opposite terminal being connected by a wire 72 to the tubular cross-member or sleeve 22 on the lever extension 21 carried by the armature 11. In the present modification the heads 24, 25, are provided with two cushioning springs 28, 28′, respectively, the latter being desirable owing to the fact that the head 25 is utilized for the purpose of a contact, the same coöperating with a fixed contact 73. In the present modification the lever armature 11 is provided with a second extension arm 74 on the order of the member 21, and is likewise provided with a terminal cross-sleeve or tube 75 traversed by a stem 76 terminating in contact heads 77, 78, and cushioned by springs 79, 79′, on the order of the parts 22, 23, 24, 25, 28, 28′. The contact 78 coöperates with a contact 80 which is connected electrically to the contact 73 by a wire or conductor 81. The contact head 77 coöperates with a contact 82 from which leads a wire 83 to the contact 61′ operating in connection with the circuit-breaker 59′. Leading from the member 75 is a wire 84 which connects with the armature or rotor of the motor M. Leading from the field of the motor is the return wire L′, a second wire 85 leading from the field to the wire 62 connecting the circuit breakers 59, 59′. The contact 61 is connected by a wire 86 to the contact 29, and the contact 80 is connected to the feed L by a wire 87.

The operation is similar to that described in connection with Fig. 1, that is to say, so long as the pointer-contact 7 remains out of contact with either of the contacts 5 or 6, the solenoids 8, 8′, will be equally energized and the path of the current will be from the line L through the solenoids 8, 8′, wire 10 and back through the return wire L′. If the conditions to which the pointer 1 responds cause the contacts 7 and 6 to come together (as for example under a rise of temperature or pressure) the path of the current will be as follows: from the line L through wire 35, members 33, 34, 31, 16, wire 15, contacts 6, 7, pointer 1, wire 9, solenoid 8′ (short circuiting the solenoid 8), wire 10 and back through line wire L′. The energization of the solenoid 8′ will raise the right hand arm of the armature lever 11, thus lifting it off the pin 20 and releasing the circuit-breaker 19, whereby the contact 24 is caused to engage the contact 29, and the contact 78 caused to engage the contact 80, a portion of the current passing through the following members, to wit, line L, wire 87, contacts 80, 78, stem 76, tube 75, wire 84, armature of motor M, wire 71, solenoid S′, wire 72, members 22, 23, contacts 24, 29, wire 86, contact 61, circuit-breaker 59, wire 62, wire 85, field of the motor M and out through the line wire L′. The solenoid S′ is thus energized, which has the effect of drawing in the plunger armatures 70, 70, secured to the upper arms of the brake levers, and releasing the lower brake-lever-arms from the brake drum or disk 65 and permitting the motor to rotate freely. The motor thus rotates so as to impart rotation to the gear wheel 55 as indicated by the arrow, said rotation permitting the cable 47′ to respond to the weight W, thus closing (or partially closing) the damper 50, the closing movement of the damper continuing until the cam 58 strikes the roller end of the circuit-breaker 59 breaking engagement between the contact 61 and said circuit-breaker and thus breaking the circuit by whose current the motor is driven and the solenoid S′ energized. The solenoid being thus deënergized, the plunger armatures 70, 70, are left free, and the spring 68 (which was under compression with the spreading of the brake lever arms) at once sets the brakes and brings the motor to a dead stop at the proper moment and before its momentum has carried it beyond the point desired. Again, should the pointer 1 swing (under a fall of pressure or temperature) so as to bring the contacts 5 and 7 together, the path of the current would be as follows, to wit: from line wire L, through solenoid 8, wire 9, pointer 1, contacts 7, 5, wire 13, members 14, 19, 18, 17, wire 10 and back through the return wire L', the solenoid 8' being short-circuited. The energization of the solenoid 8 will bring the contacts 77 and 82, and 25 and 73 together (owing to a tilting of the armature 11) and a portion of the current will flow from the line L, through wire 87, contact 80, wire 81, contacts 73, 25, stem 23, tube 22, wire 72, solenoid S', wire 71, armature of the motor M, wire 84, tube 75, stem 76, contacts 77, 82, wire 83, contact 61', circuit-breaker 59' (which was released from its cam 58' in the rotation of the wheel 55 previously described) wire 62, wire 85, field of the motor M, and back through the line wire L'. Thus again the solenoid S' is energized, the brakes released and the motor caused to run; but as will be observed, the current having been reversed in the circuit as described, the motor now rotates in the opposite direction, and the drum 57 winds up or pulls on the cable 47', thus opening the damper 50. This opening movement will continue until the cam 58' strikes the roller end of the circuit-breaker 59', thereby tripping the said circuit-breaker and breaking contact with the contact 61'. This will break the circuit to the motor and solenoid S' releasing the plunger armatures 70, 70, and again allowing the spring 68 to set the brakes.

I do not of course wish to be understood as limiting the application of the invention to furnace dampers, or to any specific form or character of motor by which the damper is actuated. The invention may be applied to any motor, actuating any movable member whatsoever, the only limitation being that the movable member controlled by the conditions such as pointed out above, shall itself control the electric current which actuates either the motor, or the element or movable member on which the operation of the motor depends. Neither do I wish to be understood as being limited to any specific details of construction, those here shown being only by way of example.

In the present application of the invention the conditions (pressure or temperature) to which the pointer 1 responds may be said to be brought about by the damper 50 since it regulates the action of the furnace by which the steam, which produces the pressure and temperature, is generated. The damper therefore may be regarded as the condition-producing element. The lamps m, n, at all times serve to indicate the presence or absence of the current, thus enabling the operator to detect should anything go wrong with the apparatus. By the term "motor" is here meant any mechanism having moving parts, and capable of actuating other mechanism.

Having described my invention what I claim is:

1. In combination with an electric circuit comprising feed and return wires and having disposed in the path thereof a pair of solenoids spaced apart, a pair of conductors coöperatively disposed relatively thereto and terminating in contacts spaced apart, a movable member responsive to predetermined conditions adapted to engage either of the contacts and connected electrically to the circuit aforesaid at a point between the solenoids, a bent lever-armature pivoted at an intermediate point between the solenoids and having its armature arms disposed opposite the respective solenoids, spring-controlled circuit-breakers adapted to be alternately tripped by the armature arms to break the circuit in which the circuit-breakers are disposed, said circuit-breakers being in the path of the conductors aforesaid, and connected electrically with the feed and return wires of the electric circuit aforesaid, a contact carrying member on one of the armature lever arms adapted to be brought into circuit with the return wire with an oscillation of the armature in one direction, a solenoid connected electrically with the contact on said lever arm member and with the feed wire respectively, a plunger armature operated by said solenoid, and a motor-control valve or element actuated by said armature.

2. In a device of the character described, a suitable gage, a dial therefor, a pointer traversing the dial, electric contacts disposed on the dial and spaced apart, means on the pointer for engaging one or the other of said contacts, an electric circuit, a pair of solenoids having armature-attracting terminals disposed in a common plane, in the path of said circuit, a bent lever-armature having two arms pivoted between the solenoids, each arm of the lever being adapted to be swung into the plane of disposition of the solenoid terminals aforesaid to serve as an armature for its respective solenoid, suitable electric connections operating to short-circuit one of the solenoids upon contact of the pointer with one of the dial contacts, a motor-controlling solenoid in circuit with the electric circuit aforesaid, a reversible motor, and an armature responding to the motor-controlling solenoid and directly affecting the action of the motor.

In testimony whereof I affix my signature in presence of two witnesses.

CHARLES H. HERR.

Witnesses:
 EMIL STAREK,
 ELSE M. SIEGEL.